United States Patent
Muroi et al.

(10) Patent No.: US 6,794,840 B2
(45) Date of Patent: Sep. 21, 2004

(54) MOTOR CONTROL METHOD AND MOTOR CONTROL APPARATUS

(75) Inventors: Kazushige Muroi, Nagoya (JP); Masatoshi Kokubo, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/390,705

(22) Filed: Mar. 19, 2003

(65) Prior Publication Data

US 2003/0189414 A1 Oct. 9, 2003

(30) Foreign Application Priority Data

Mar. 22, 2002 (JP) ........................................ 2002-080861

(51) Int. Cl.⁷ ................................................ G05B 5/00
(52) U.S. Cl. ........................ 318/466; 318/465; 318/468
(58) Field of Search ................................ 318/466, 465, 318/468

(56) References Cited

U.S. PATENT DOCUMENTS 5,892,997 A * 4/1999 Yoshizawa et al. ......... 396/410
5,995,315 A * 11/1999 Fasen ....................... 360/77.01

FOREIGN PATENT DOCUMENTS

JP  A 2001-186785  7/2001
JP  A 2001-251878  9/2001

* cited by examiner

*Primary Examiner*—Karen Masih
(74) *Attorney, Agent, or Firm*—Oliff & Berridge, PLC

(57) ABSTRACT

An edge detector 15 of an ASIC 3 detects a pass timing signal indicating a timing in which slits of a slit plate pass light emitting and receiving elements of a photo interrupter, and the rotation direction of a transfer roller based on phase-A and phase-B signals from an encoder 56. A position counter 16 counts the pass timing signal in accordance with the rotation direction of the transfer roller. When a count comparator 17 detects the agreement of the count value of the position counter 16 with the set value of a stop position setting register 12, a stop position processor 22 counts a delay time, and outputs a stop command signal of an LF motor to a PWM generator 8 in the timing of agreement with the set value of a time setting register 11.

12 Claims, 11 Drawing Sheets

MOTOR CONTROL METHOD AND MOTOR CONTROL APPARATUS

BACKGROUND OF THE INVENTION

1. Field of the Invention

The present invention relates to a motor control method and apparatus for controlling a motor based on a pass timing signal indicating a timing in which a motor movable part or a member to be driven by the motor passes each of a plurality of preset defined positions.

2. Description of the Related Art

In a conventional sheet transfer mechanism of a printer, in general, a transfer roller for transferring a printing sheet is connected to a pulley attached to a rotation shaft of a motor via an endless belt, and is driven by a motor driving force which is transmitted via the endless belt. It is to be noted that a rotary encoder is usually attached to the transfer roller. This rotary encoder outputs two-phase (phases A, B) pulse string signals which are synchronized with the rotation of the transfer roller and which have a predetermined phase difference from each other. Moreover, a motor control apparatus for driving/controlling the motor detects rotation direction and angle of the transfer roller based on these two-phase pulse string signals, and rotates the transfer roller to a targeted rotation position.

Concretely, with the rotation of the transfer roller, the rising and falling edges of the pulse string signals of two phases correspond to timings in which slits formed at equal intervals along the outer edge of the disc-shaped slit plate of the rotary encoder pass one light emitting element and two light receiving elements in the photo interrupter of the rotary encoder. Therefore, in the motor control apparatus, when the predetermined edges in the pulse string signals of two phases are successively counted based on a phase relation between the pulse string signals of two phases, the rotation position of the transfer roller can relatively be detected.

Moreover, as shown in a timing chart of FIG. 11, the motor control apparatus stops the motor in the timing in which the edge corresponding to a target rotation position is detected, and stops the transfer roller in the target rotation position.

Additionally, various forces such as the tensile force of the endless belt act on the rotation shaft of the motor. Therefore, when the motor is stopped, the rotation shaft of the motor sometimes rotates in a reverse direction by these forces (this reverse rotation will be hereinafter referred to as "return"). Moreover, in the motor control apparatus, the motor is stopped in the timing in which the target rotation position is reached. Therefore, even with the micro return amount of the transfer roller generated by the return of the motor, the photo interrupter of the rotary encoder detects the slit corresponding to the target rotation position again, which has already been detected. In this case, it is sometimes judged that the roller has returned by one slit.

Following this judgment, in order to stop the transfer roller in a correct position, the motor control apparatus supposedly assumes that the transfer roller has actually returned by one slit, rotates the transfer roller by one slit, and corrects the rotation position of the transfer roller. However, in actual, when the return amount of the transfer roller is micro and less than the amount corresponding to one slit, a printing position into the printing sheet deviates by the correction. This causes a problem that printing quality is deteriorated.

Moreover, when the motor control apparatus is set not to correct the rotation position of the transfer roller for the return by one slit in consideration of the above-described problem, the printing quality can be prevented from being deteriorated for the micro return. However, the actually generated return by one slit cannot be handled, and the printing quality is deteriorated.

That is, in the related art apparatus, it has been difficult to judge whether or not the correction is necessary for the return of the motor.

SUMMARY OF THE INVENTION

The present invention has been developed to solve the above-described problems, and an object thereof is to provide a motor control method and apparatus for preventing a motor movable part or a member to be driven by a motor from passing a target stop position again in a reverse direction even with a micro motor return.

To attain this and other objects, according to the present invention, there is provided a motor control method for controlling a motor based on a pass timing signal indicating a timing in which a motor movable part or a member to be driven by a motor passes each of a plurality of preset defined positions. On detecting the timing corresponding to a target stop position in which the movable part or the member to be driven is to be stopped based on the pass timing signal, the motor is stopped in a preset stop timing while the movable part or the member to be driven reaches the defined position disposed beyond and adjacent to the target stop position.

According to the motor control method, the motor movable part or the member to be driven is stopped between the target stop position and the defined position disposed beyond and adjacent to the target stop position. Therefore, the motor movable part or the member to be driven can be prevented from passing the target stop position again in a reverse direction even with a micro motor return.

It is to be noted that the pass timing signal indicates a signal whose signal level is reversed every pass timing in which the motor movable part or the member to be driven passes the defined position.

According to another aspect of the present invention, there is provided a motor control apparatus comprising: a pass timing generator for generating a pass timing signal indicating a timing in which a movable part of a motor or a member to be driven by the motor passes each of a plurality of preset defined positions; and a stop instructing portion for instructing the motor to stop the movable part or the member to be driven in the defined position disposed beyond and adjacent to a target stop position, when detecting the timing corresponding to the target stop position in which the movable part or the member to be driven is to be stopped based on the pass timing signal generated by the pass timing generator.

In the motor control apparatus of the present invention constituted as described above, the pass timing generator generates the pass timing signal indicating the timing in which the movable part of the motor or the member to be driven by the motor passes each of a plurality of preset defined positions. Moreover, on detecting the timing corresponding to the target stop position in which the movable part of the motor or the member to be driven is to be stopped based on the pass timing signal, the stop instructing portion instructs the motor to stop in the preset stop timing while the movable part or the member to be driven reaches the defined position disposed beyond and adjacent to the target stop position.

That is, the apparatus constituted as described above realizes the motor control method according to the present invention, and can obtain an effect similar to that of the method according to the present invention.

It is to be noted that for the stop timing, the stop instructing portion includes a timer for starting measurement of time, on detecting the timing corresponding to the target stop position, and a time at which the timer ends the measurement of a preset delay time may also be set to the stop timing.

Moreover, according to the present invention, the pass timing generator includes an encoder for generating a pulse string in which at least one of rising and falling edges corresponds to the pass timing of the defined position as the pass timing signal. In this case, the stop instructing portion may include: a delay edge detector for detecting the edge of the pulse string generated while the movable part or the member to be driven passes the defined position corresponding to the target stop position and reaches the defined position disposed beyond and adjacent to the target stop position; and a stop timing generator for generating the stop timing based on the timing of the edge detected by the delay edge detector.

In the stop instructing portion constituted in this manner, the delay edge detector detects the edge of the pulse string generated while the movable part of the motor or the member to be driven passes the defined position corresponding to the target stop position and subsequently reaches the defined position disposed beyond and adjacent to the target stop position. The stop timing generator generates the stop timing based on the timing of the edge detected by the delay edge detector.

That is, the motor is stopped in the stop timing generated based on the edge of the pulse string generated between the target stop position and the adjacent defined position. Therefore, the movable part of the motor or the member to be driven can be stopped between the target stop position and the defined position disposed beyond and adjacent to the target stop position.

It is to be noted that in the present invention when the encoder generates the pass timing signal as well as a direction judgment signal having a phase different from that of the pass timing signal, the delay edge detector may also be constituted to detect the edge of the direction judgment signal.

In this case, the stop timing generator can generate the stop timing based on the timing in which the delay edge detector detects the edge of the direction judgment signal.

That is, the stop timing of the movable part of the motor or the member to be driven can more finely be set.

Here, the stop timing generator may generate the timing of the edge detected by the delay edge detector as the stop timing. Alternatively, the stop timing generator includes the timer for starting the measurement of time by the timing of the edge detected by the delay edge detector, and may generate a time at which the timer ends the measurement of the preset delay time as the stop timing.

It is to be noted that according to the present invention the encoder may include a rotary or linear encoder, or may include an optical or magnetic encoder.

BRIEF DESCRIPTION OF THE DRAWINGS

Embodiments of the present invention will be described hereinafter with reference to the drawings, in which.

DETAILED DESCRIPTION OF PREFERRED EMBODIMENTS

Preferred embodiments of the present invention will be described hereinafter with reference to the drawings.

Figure 1:
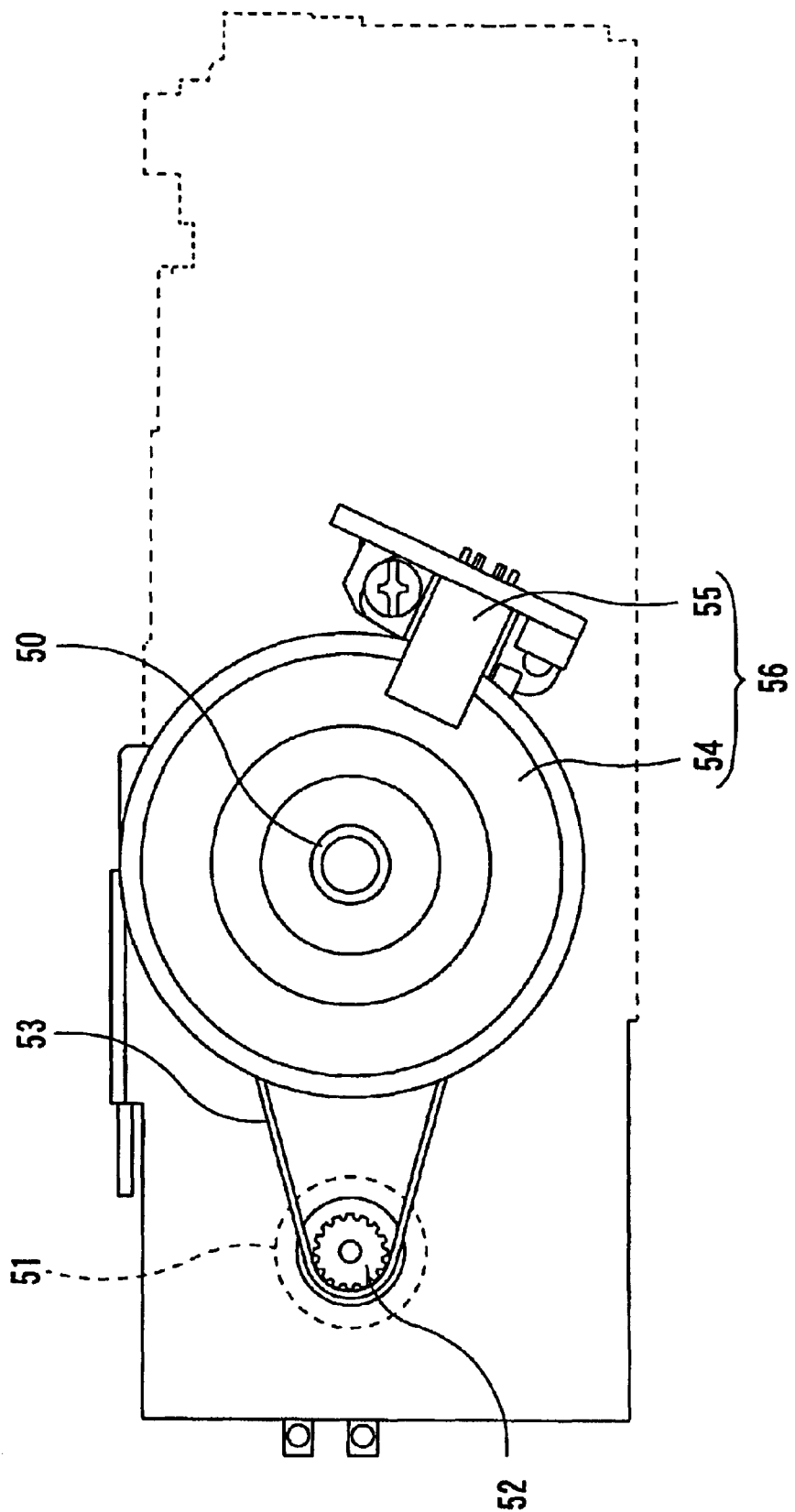
FIG. 1 is an explanatory view showing the structure of a sheet feed mechanism in a printer to which the present invention is applied.

First, FIG. 1 is an explanatory view showing the structure of a sheet feed mechanism in a printer to which the present invention is applied.

As shown in FIG. 1, the sheet feed mechanism of the printer to which the present invention is applied includes: a transfer roller 50 for transferring a printing sheet; and a motor 51 (hereinafter referred to as "LF motor") for driving the transfer roller 50. Moreover, a pulley 52 attached to the rotation shaft of the LF motor 51 is connected to the transfer roller 50 via an endless belt 53, so that the driving force of the LF motor 51 is transmitted to the transfer roller 50 via the endless belt 53.

Here, a disc-shaped slit plate 54 in which a plurality of slits are formed at equal intervals along an outer peripheral edge is attached to the transfer roller 50. In cooperation with the transfer roller 50, the slit plate 54 is rotated. Moreover, in the vicinity of the slit plate 54, a photo interrupter 55 is disposed including one light emitting element disposed opposite to two light receiving elements via the slit plate 54. Every time the slits in the slit plate 54 pass between one light emitting element and two light receiving elements, pulse signals of two phases (phases A, B) are outputted. Additionally, one light emitting element and two light receiving elements of the photo interrupter 55 are disposed so that the phase-A and phase-B signals have a phase difference of $\pi/2$ from each other. It is to be noted that in recent years it has also been possible to use another photo interrupter which includes one light emitting element and a plurality of (e.g., five) light receiving elements and which can output the pulse signals of two phases with good precision even with dirt in the slits.

Moreover, the slit plate 54 and photo interrupter 55 constitute a rotary encoder 56 (hereinafter referred to simply as "encoder").

First Embodiment

Figure 2:
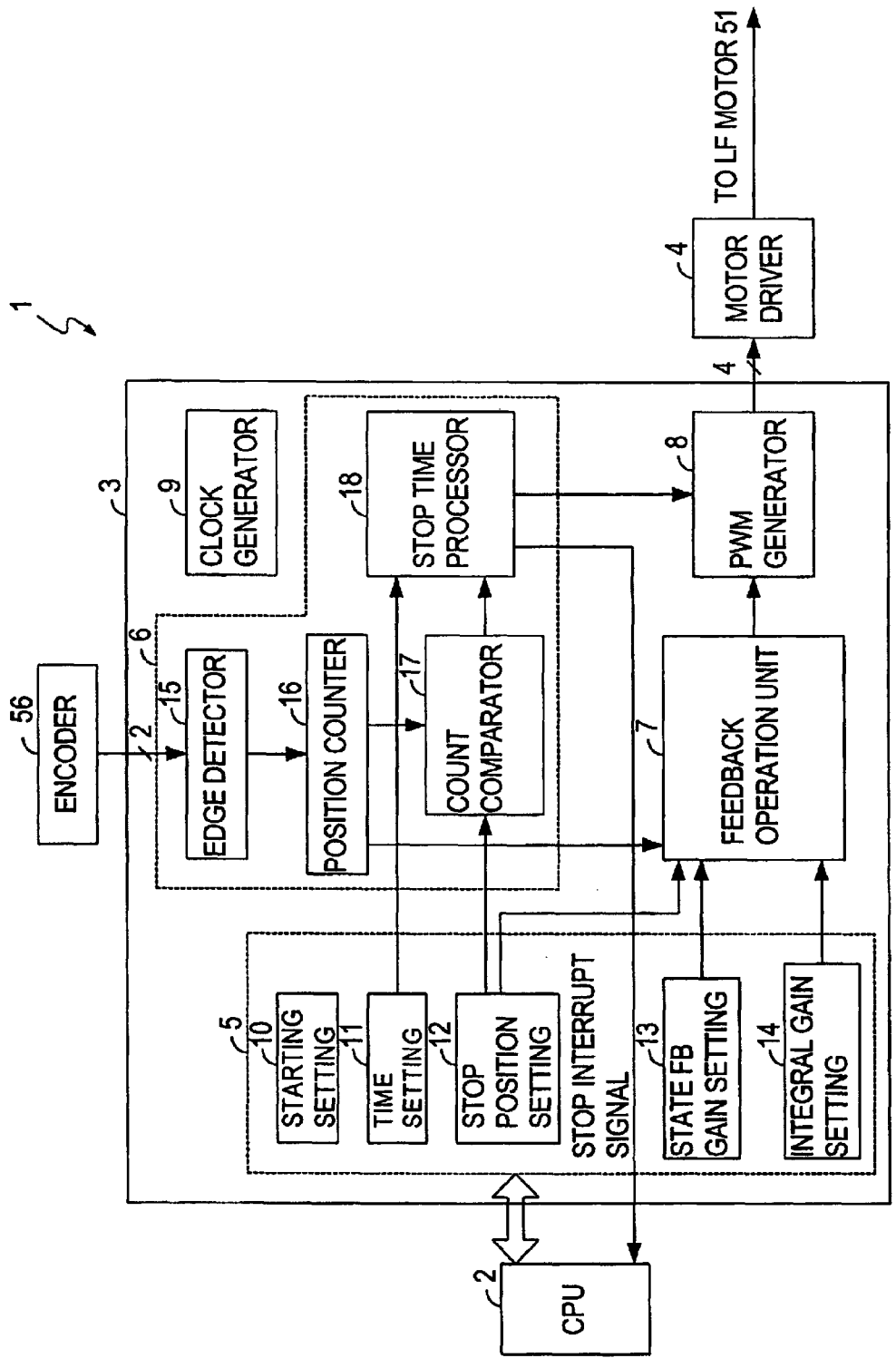
FIG. 2 is a block diagram showing the constitution of a motor control apparatus 1 in a first embodiment.

FIG. 2 is a block diagram showing the constitution of a motor control apparatus according to the present invention.

As shown in FIG. 2, the motor control apparatus 1 includes: the above-described encoder 56; an application specific integrated circuit (ASIC) 3 which generates a PWM signal to control the rotation speed or direction of the LF motor 51 based on various set values inputted from a CPU 2 for generally controlling the printer, and pulse string signals of two phases inputted from the encoder 56; and a motor driver 4 for driving the LF motor 51 based on the PWM signal generated by the ASIC 8.

It is to be noted that the ASIC 3 includes: a register group 5 in which various parameters for use in controlling the LF motor 51 are stored; a roller positioning section 6 for taking the phase-A and phase-B signals from the encoder 56 to calculate the rotation position of the transfer roller 50; a feedback operation unit 7 which generates a motor control signal for controlling the rotation angle or direction of the rotation shaft of the LF motor 51 based on data from the roller positioning section 6; a PWM generator 8 for generating four PWM signals which have a duty ratio in response to the motor control signal generated by the feedback operation unit 7; and a clock generator 9 which generates a clock signal sufficiently shorter in period than the phase-A and phase-B signals and which supplies the clock signal to each component in the ASIC 3.

Here, the register group 5 includes: a starting setting register 10 for starting the LF motor 51; a time setting register 11 for setting a delay time t from when the rotation position of the transfer roller 50 reaches a target stop position until a stop operation for the LF motor 51 is performed; a stop position setting register 12 for setting the target stop position of the transfer roller 50; a state FB gain setting register 13 for setting a state feedback (state FB) gain for use in a feedback operation to control the rotation angle of the transfer roller 50; and an integral gain setting register 14 for setting an integral gain for use in the feedback operation to correct the offset of the rotation angle of the transfer roller 50.

Moreover, the roller positioning section 6 includes an edge detector 15 for detecting a pass timing signal indicating a timing in which the slits of the slit plate 54 pass the light emitting and receiving elements of the photo interrupter 55, and the rotation direction of the transfer roller 50 based on the phase-A and phase-B signals from the encoder 56. Here, the pass timing signal indicates the edge of the phase-A signal at a time at which the phase-B signal is in a high level. For the rotation direction, when the pass timing signal corresponds to the falling edge of the phase-A signal, forward rotation is detected. When the signal corresponds to the rising edge, backward rotation is detected. The roller positioning section further includes a position counter 16 for counting up based on the pass timing signal with the forward rotation direction of the transfer roller 50 detected by the edge detector 15 and for counting down based on the pass timing signal with the backward rotation direction to detect the rotation position of the transfer roller 50. That is, the target stop position of the transfer roller 50 set by the stop position setting register 12 is represented by the count value of the position counter 16.

Figure 3:
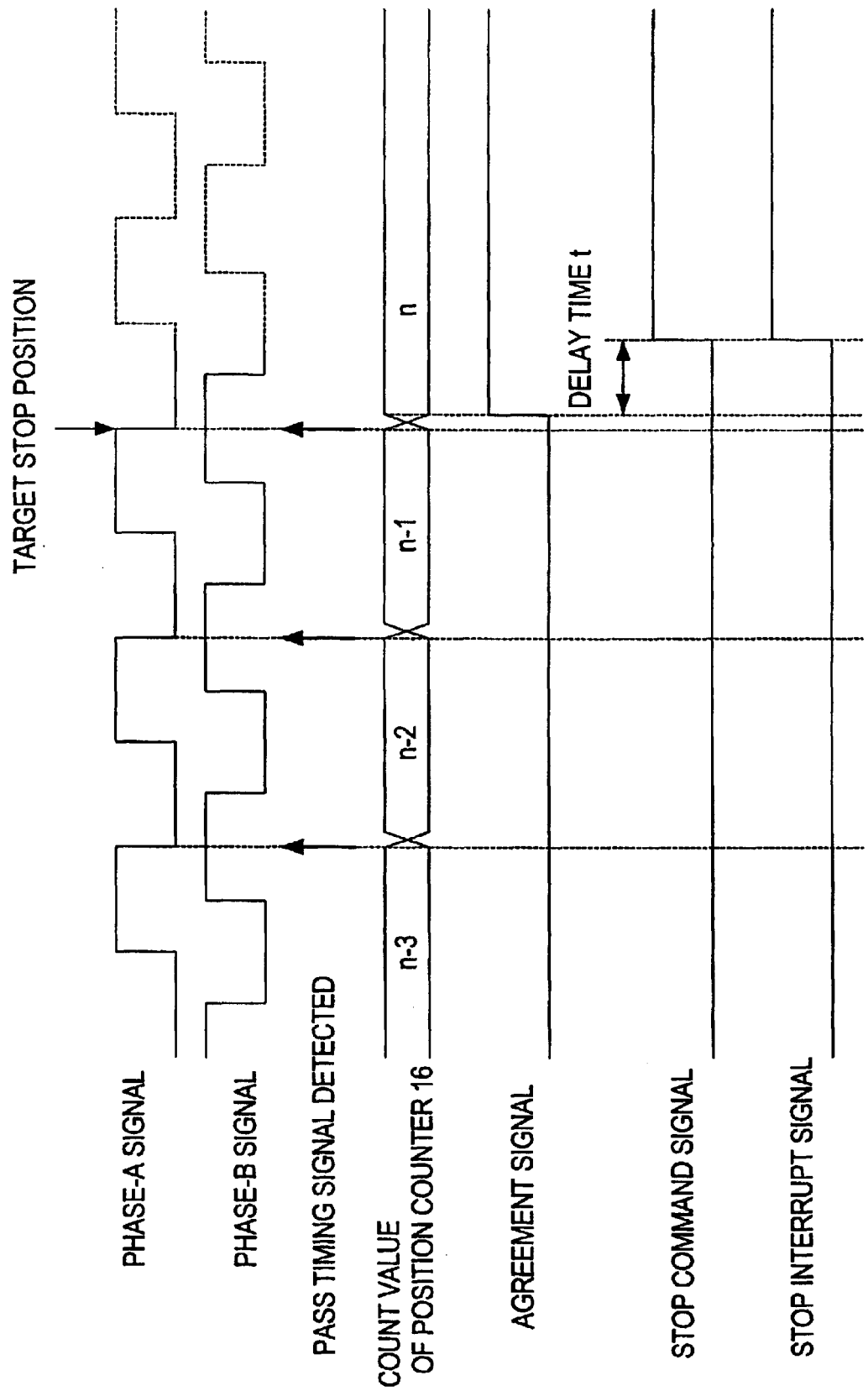
FIG. 3 is a flowchart showing the outline of various signals generated based on a phase-A signal, phase-B signal, and pulse string signals of these two phases of an encoder 56.

Furthermore, the roller positioning section 6 includes: a count comparator 17 for comparing the count value of the position counter 16 with the set value (i.e., the target stop position) of the stop position setting register 12 to generate an agreement signal, when these values agree with each other. The section further includes: a stop time processor 18 which uses the clock signal to start counting time on detecting the agreement signal of the count comparator 17 and which outputs a stop command signal of the LF motor 51 to the PWM generator 8 in a timing of agreement of this count value with the set value of the time setting register 11 and which outputs a stop interrupt signal to the CPU 2 (see FIG. 3). Additionally, the set value (i.e., the delay time t) of the time setting register 11 is set to be not less than a time interval from when the pass timing signal corresponding to the target stop position is detected until the rotation position of the transfer roller 50 reaches a position passed from the target stop position by an allowable return amount and to be less than a time interval until the next pass timing signal (hereinafter referred to as "adjacent signal") is detected. In a preferable time interval, the rotation position of the transfer roller 50 reaches the vicinity of a center between the slit corresponding to the target stop position and the slit disposed beyond and adjacent to the target stop position.

Figure 4:
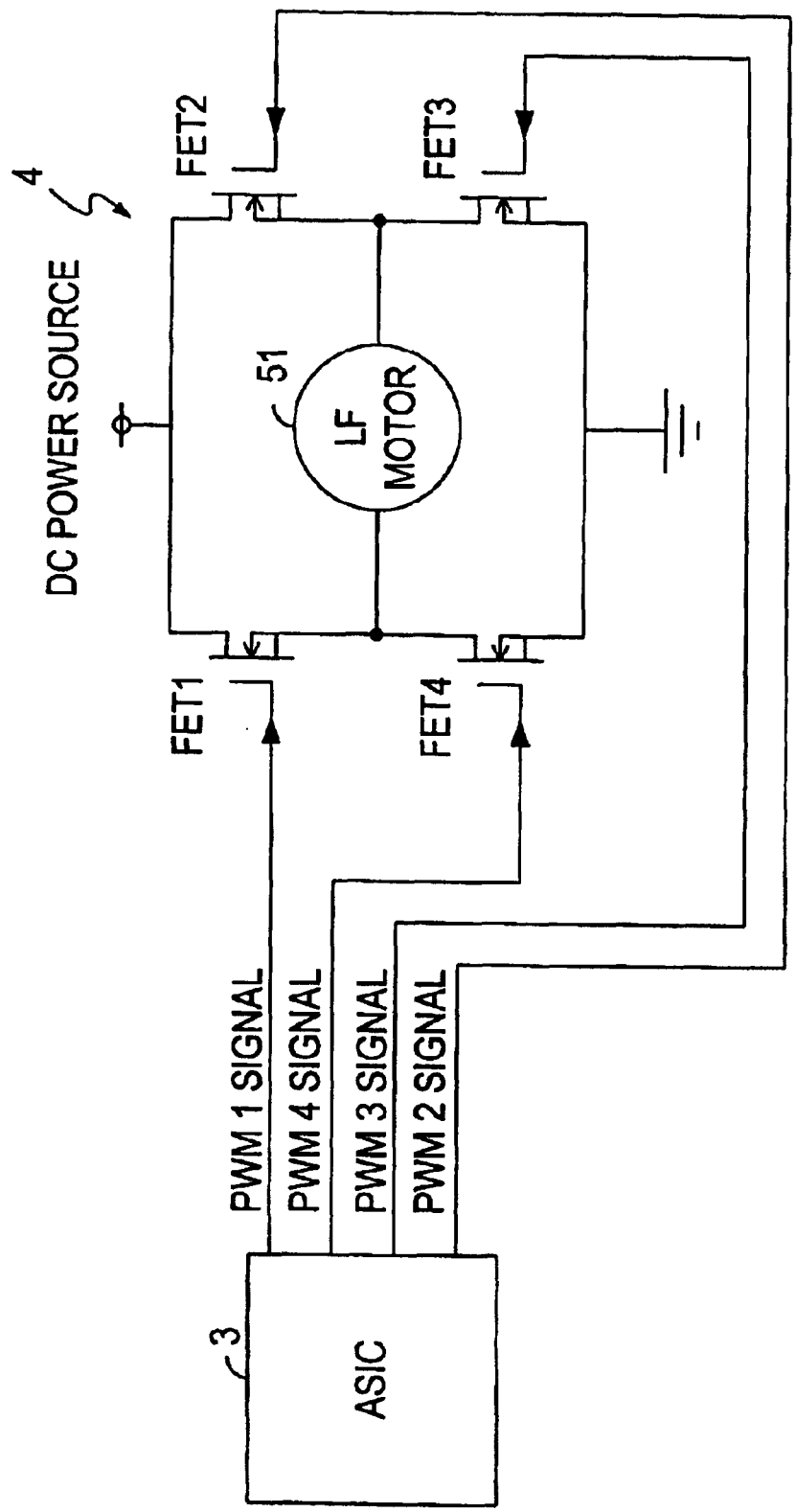
FIG. 4 is an explanatory view showing the circuit constitution of a motor driver 4, and the connection state of the motor driver 4 to an ASIC 3 and LF motor 51.

Here, FIG. 4 shows the circuit constitution of the motor driver 4, and the connection state of the motor driver 4 with the ASIC 3 and LF motor 51.

As shown in FIG. 4, the motor driver 4 includes four MOSFETs (hereinafter referred to simply as "FET") of an N channel enhancement type. The FET 1 and FET 4 connected in series to each other are connected in parallel to the FET 2 and FET 3 connected in series to each other between the positive electrode side of a direct-current power source (DC power source) and ground. Moreover, the LF motor 51 is connected to the connection point of the FET 1 to the FET 4 and the connection point of the FET 2 to the FET 3, so that a so-called H bridge circuit is formed.

Moreover, four PWM signals (PWM 1, 2, 3, 4 signals) generated by the PWM generator 8 are supplied to the gates of the FETs 1, 2, 3, 4 of the motor driver 4. In response to these PWM signals, the respective FETs turn ON/OFF to control the amount and direction of a current passed through the LF motor 51. It is to be noted that here the rotation direction of the LF motor 51 with respect to the current flowing to the FET 3 from the FET 1 is assumed to be a forward rotation direction, and the rotation direction of the LF motor 51 with respect to the current flowing to the FET 4 from the FET 2 is assumed to be a backward rotation direction. Moreover, each FET is connected in parallel with a diode (not shown) so that the cathode of the diode is directed on the upstream side of the H bridge circuit, and an anode is directed on a downstream side. When the back electromotive force of the LF motor 51 generated in turning ON/OFF each FET is regenerated in the DC power source, each FET is protected from the back electromotive force.

In the motor control apparatus 1 constituted as described above (see FIG. 2), the feedback operation unit 7 generates the motor control signal based on a difference between the count value of the position counter 16 and the set value of the stop position setting register 12, control amount which is the basis of the motor control signal, state FB gain, and integral gain, and outputs the signal to the PWM generator 8. Moreover, the PWM generator 8 generates four PWM signals based on this motor control signal, controls and turns ON/OFF each FET of the motor driver 4, and thereby drives/controls the LF motor 51.

This control is repeatedly performed, and the count comparator 17 detects that the count value of the position counter 16 agrees with the set value (target stop position) of the stop position setting register 12, and outputs the agreement signal to the stop time processor 18. Then, the stop time processor 18 starts counting the delay time t. Subsequently, in the timing in which the count value of the stop time processor 18 agrees with the set value of the time setting register 11, the stop time processor 18 outputs the stop command signal to the PWM generator 8, so that the LF motor 51 is stopped. Additionally, the stop time processor outputs the stop interrupt signal to the CPU 2.

Figure 5:
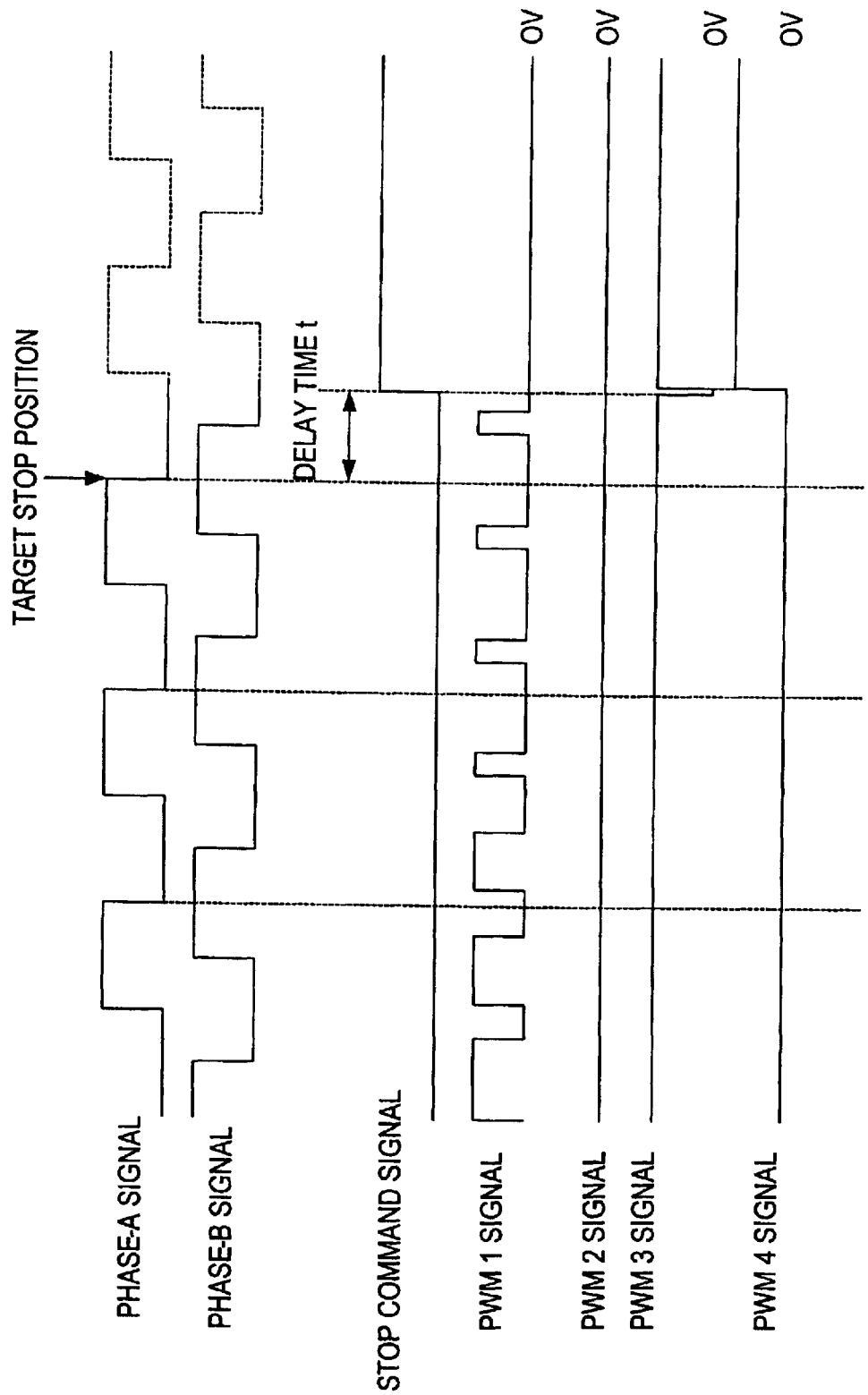
FIG. 5 is a timing chart showing the states of four PWM signals in stopping the LF motor 51.

Here, FIG. 5 is a timing chart showing the states of four PWM signals in stopping the LF motor 51.

As shown in FIG. 5, on detecting the stop command signal of the stop time processor 18, the PWM generator 8 first turns OFF all the FETs for a predetermined time (e.g., 3 μs), and simultaneously turns ON the FETs 3, 4 on the downstream side in the H bridge circuit. The opposite terminals of the LF motor 51 are short-circuited with respect to the ground of the DC power source, and the LF motor 51 is stopped by a so-called dynamic brake.

Here, a flow of driving process of the transfer roller 50 performed by the CPU 2 of the printer will be described with reference to a flowchart shown in FIG. 6.

Figure 6:
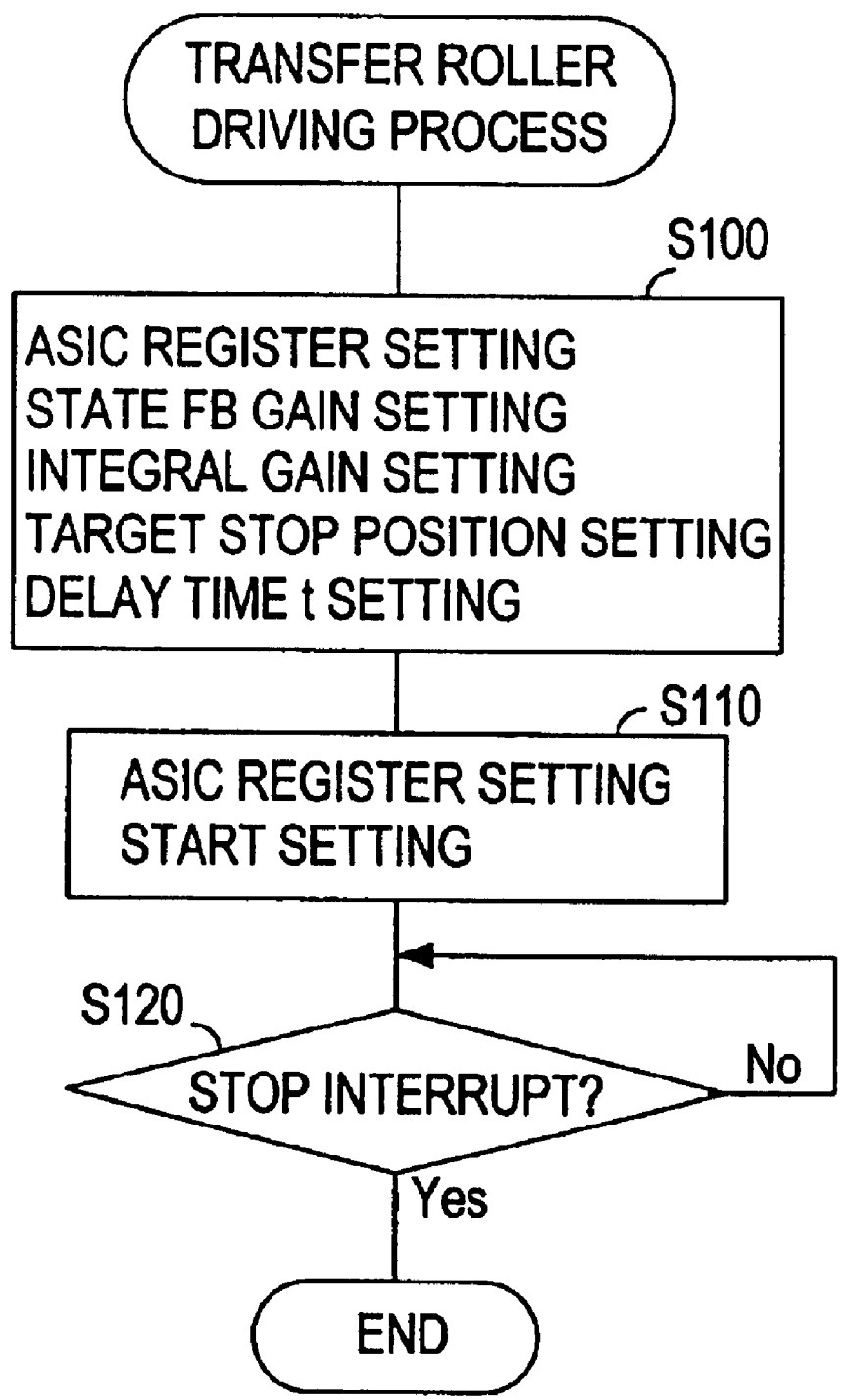
FIG. 6 is a flowchart showing the flow of driving process of a transfer roller 50 performed by CPU of the printer in the first embodiment.

When the present process is started, as shown in FIG. 6, the CPU 2 first assumes a position in which the transfer roller 50 stops now as an original point, and sets the state FB gain, integral gain, target stop position, and delay time t in the respective registers constituting the register group 5 of the ASIC 3 (S100). Thereafter, the CPU 2 writes data into the starting setting register 10 to start each component of the ASIC 8 (S110). Subsequently, the transfer roller 50 driven in accordance with the content set in each register in S100 reaches the target stop position. With an elapse of delay time t, there is an input of stop interrupt signal from the stop time processor 18 (Yes: S120). Then, the present process ends.

In the motor control apparatus 1 constituted as described above, in the time interval after the pass timing signal corresponding to the target stop position of the transfer roller 50 is detected until the rotation position of the transfer roller 50 reaches the position passed from the target stop position by at least the allowable return amount, the LF motor 51 is stopped. Therefore, even with the generation of micro return, the photo interrupter 55 of the encoder 56 can be prevented from detecting the slit corresponding to the already detected target stop position again.

That is, only with the return which causes a deviation from the printing position, the photo interrupter 55 again detects the slit corresponding to the already detected target stop position. Therefore, the motor control apparatus 1 is set so as to correct the deviation at this time, and this can prevent the printing quality from dropping.

Figure 7:
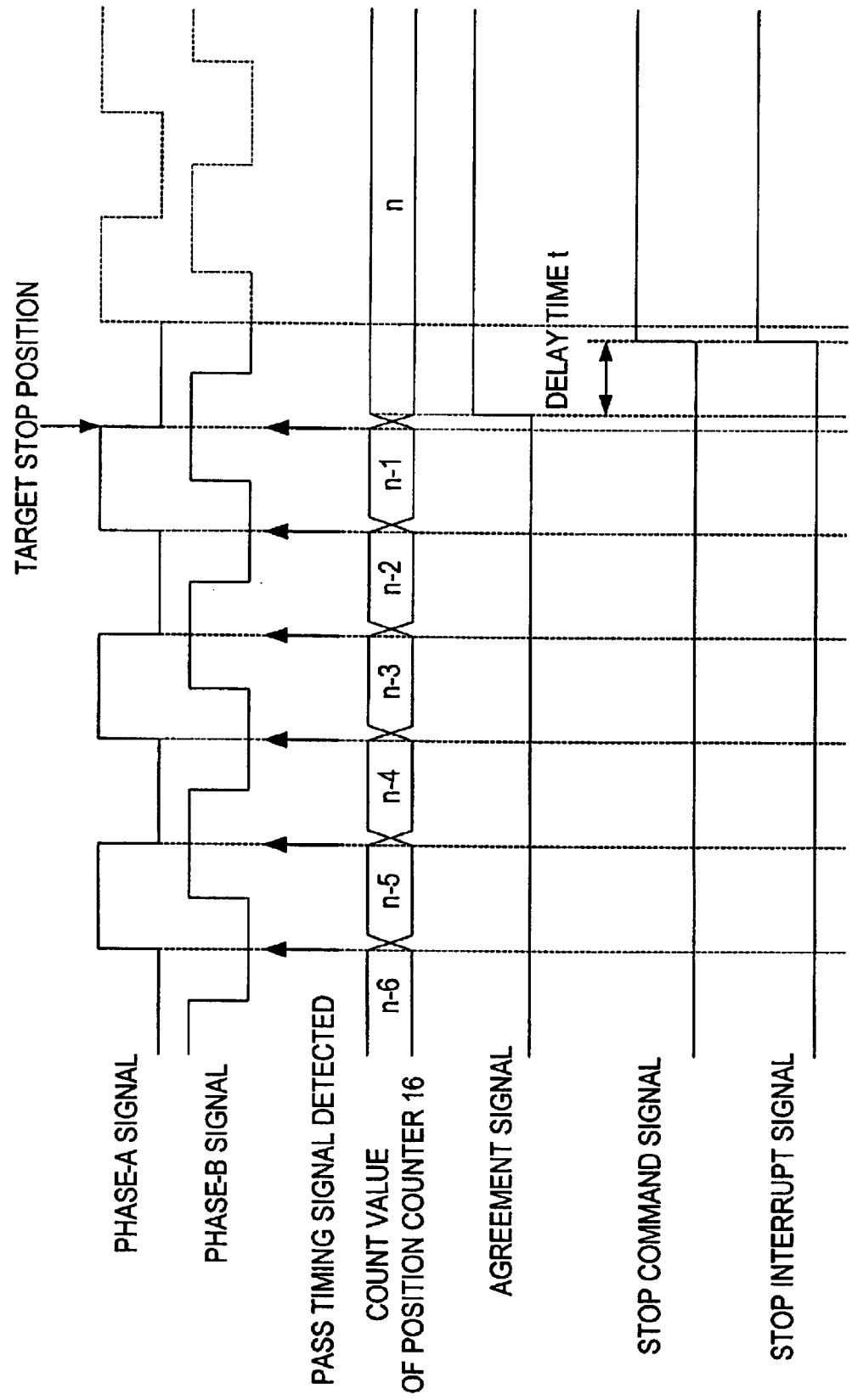
FIG. 7 is a timing chart showing the outline of various signals with the use of twice count.
Figure 8:
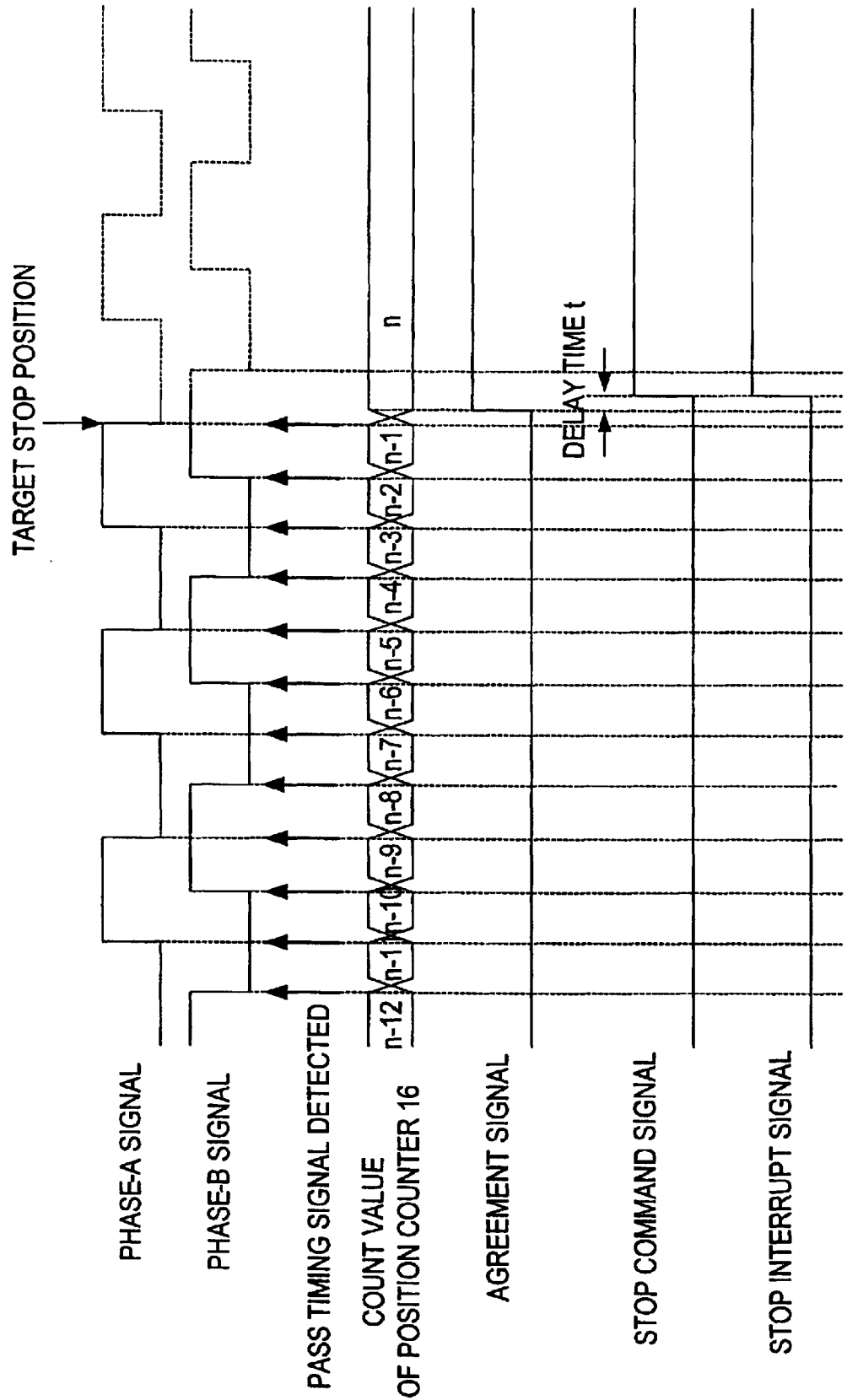
FIG. 8 is a timing chart showing the outline of various signals with the use of four-time count.

Here, in the above-described embodiment, the roller positioning section 6 counts the edge of the phase-A signal at a time at which the phase-B signal is in a high level as the pass timing signal. A so-called once count is performed to detect the rotation position of the transfer roller 50, but a so-called twice count (see FIG. 7) in which the opposite edges of the phase-A signal are counted as the pass timing signals, or a so-called four-time count (see FIG. 8) in which the opposite edges of the phase-A and phase-B signals are counted as the pass timing signals may also be performed to detect the rotation position of the transfer roller. 50, Here, in this case, the delay time t is adjusted in accordance with the interval of the edges for use in the pass timing signal.

When the twice or four-time count is used in this manner, the rotation position of the transfer roller 50 can be set to be finer than that in the above-described embodiment, and the printing quality can further be enhanced.

Second Embodiment

Next, a second embodiment will be described.

Since the motor control apparatus of the present embodiment is different from the motor control apparatus 1 of the first embodiment only in the inner constitution of the ASIC and a part of the content of the process performed by the CPU, the same constitution as that of the first embodiment is denoted with the same reference numerals, description thereof is omitted, and a different constitutional part will mainly be described.

Figure 9:
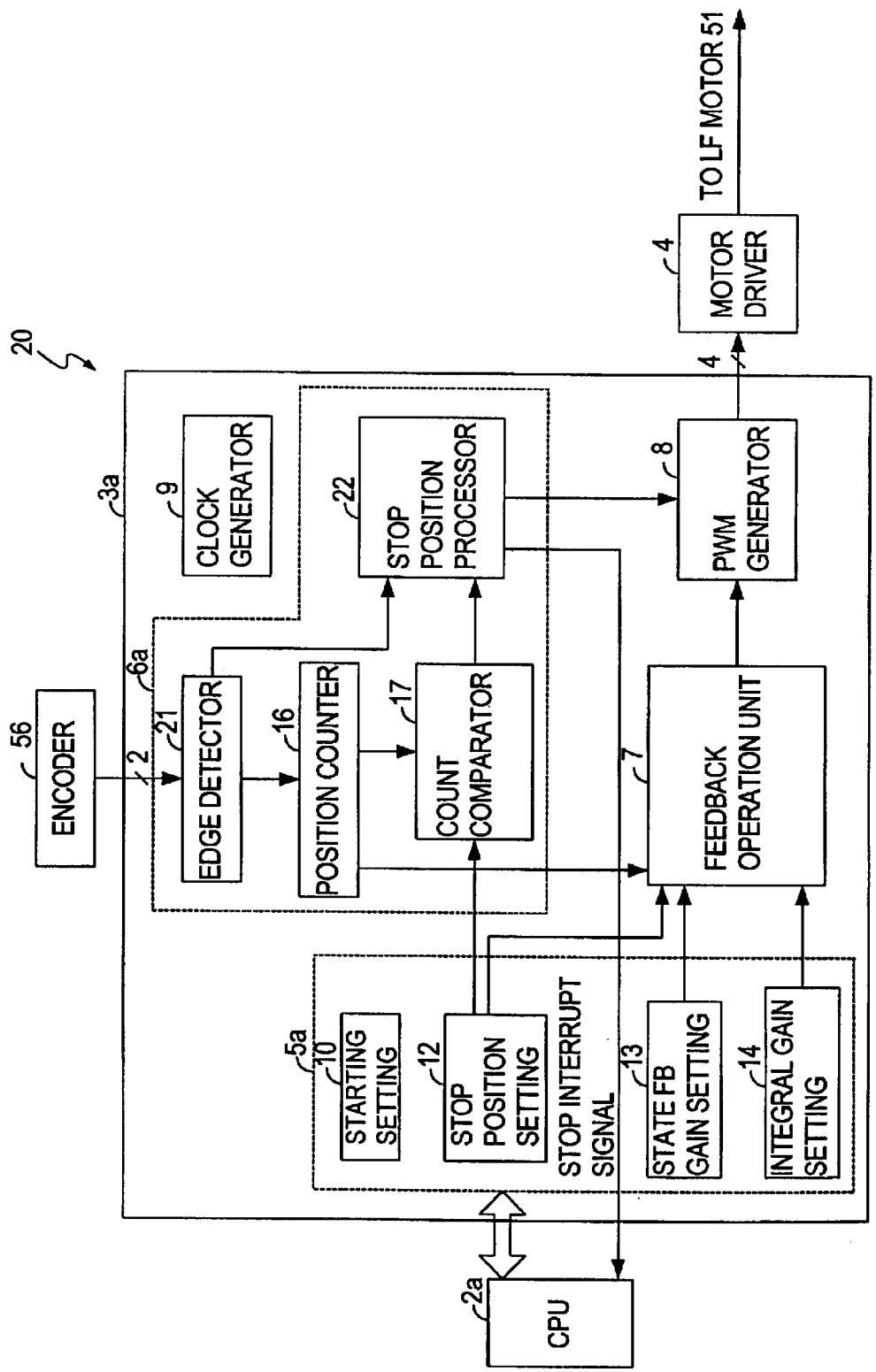
FIG. 9 is a block diagram showing the constitution of a motor control apparatus 20 in a second embodiment.

As shown in FIG. 9, a register group 5a of an ASIC 3a in a motor control apparatus 20 of the present embodiment includes a constitution in which the time setting register 11 is removed from the register group & of the first embodiment.

Moreover, instead of the edge detector 15 of the roller positioning section 6 of the first embodiment, a roller positioning section 6a includes an edge detector 21 which detects the respective edges of the phase-A and phase-B signals, the pass timing signal similar to that of the first embodiment, and the rotation direction of the transfer roller 50 (similar to that of the first embodiment) based on the phase-A and phase-B signals from the encoder 56.

Furthermore, instead of the stop time processor 18 of the roller positioning section 6 of the first embodiment, the roller positioning section 6a includes a stop position processor 22 which outputs the stop command signal of the LF motor 51 to the PWM generator 8 in synchronization with the edge (here, the falling edge of the phase-B signal) detected first by the edge detector 21 after the agreement signal of the count comparator 17 is detected. Additionally, the stop position processor outputs the stop interrupt signal to a CPU 2a (see FIG. 9).

In the motor control apparatus 20 constituted in this manner, in the same manner as in the motor control apparatus 1 of the first embodiment, the feedback operation unit 7 generates the motor control signal based on the difference between the count value of the position counter 16 and the set value of the stop position setting register 12, control variable which is the basis of the motor control signal, state FB gain, and integral gain, and outputs the signal to the PWM generator 8. Moreover, the PWM generator 8 generates four PWM signals based on this motor control signal, controls and turns ON/OFF each FET of the motor driver 4, and thereby drives/controls the LF motor 51.

Figure 10:
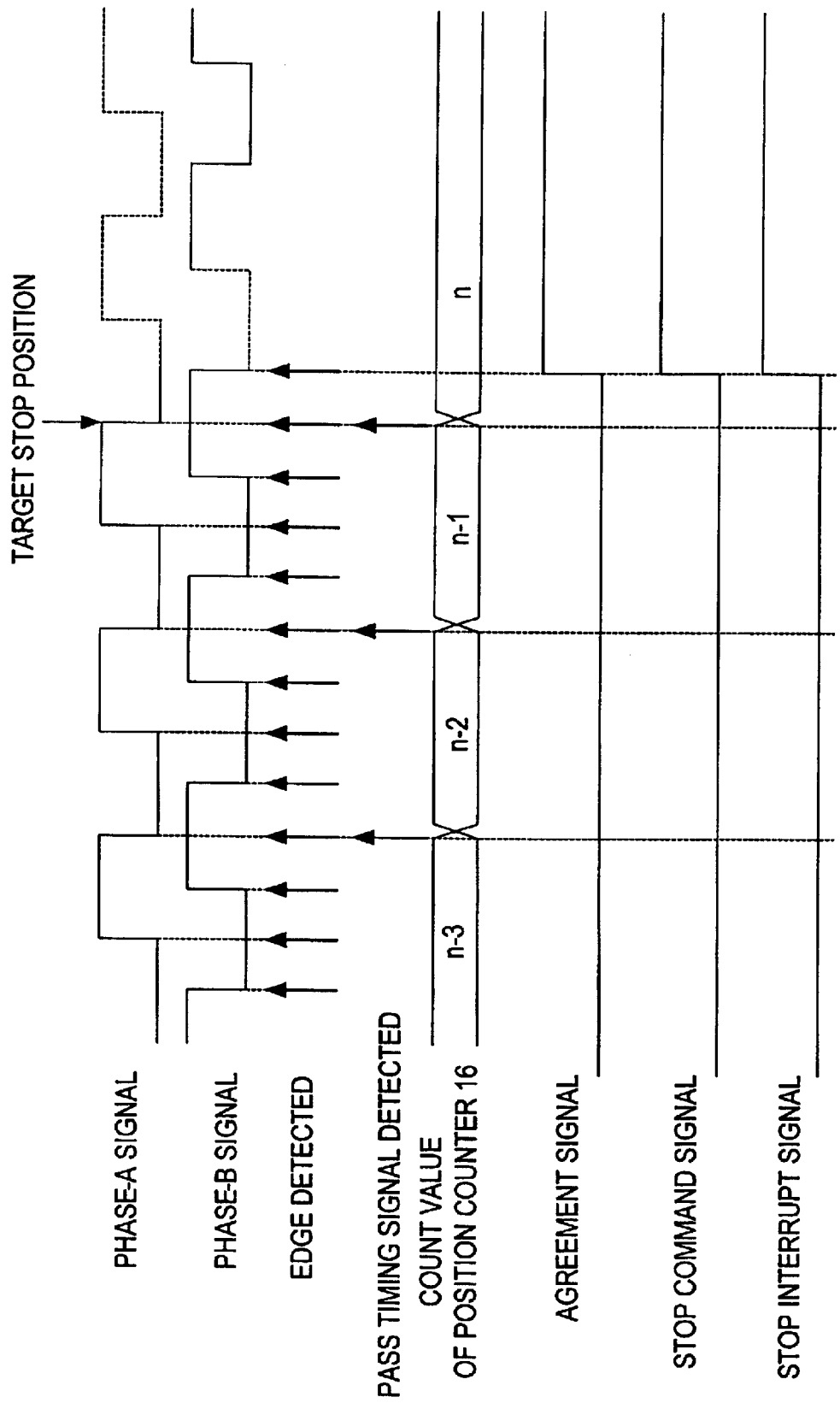
FIG. 10 is a flowchart showing the outline of various signals in the motor control apparatus 20.
Figure 11:
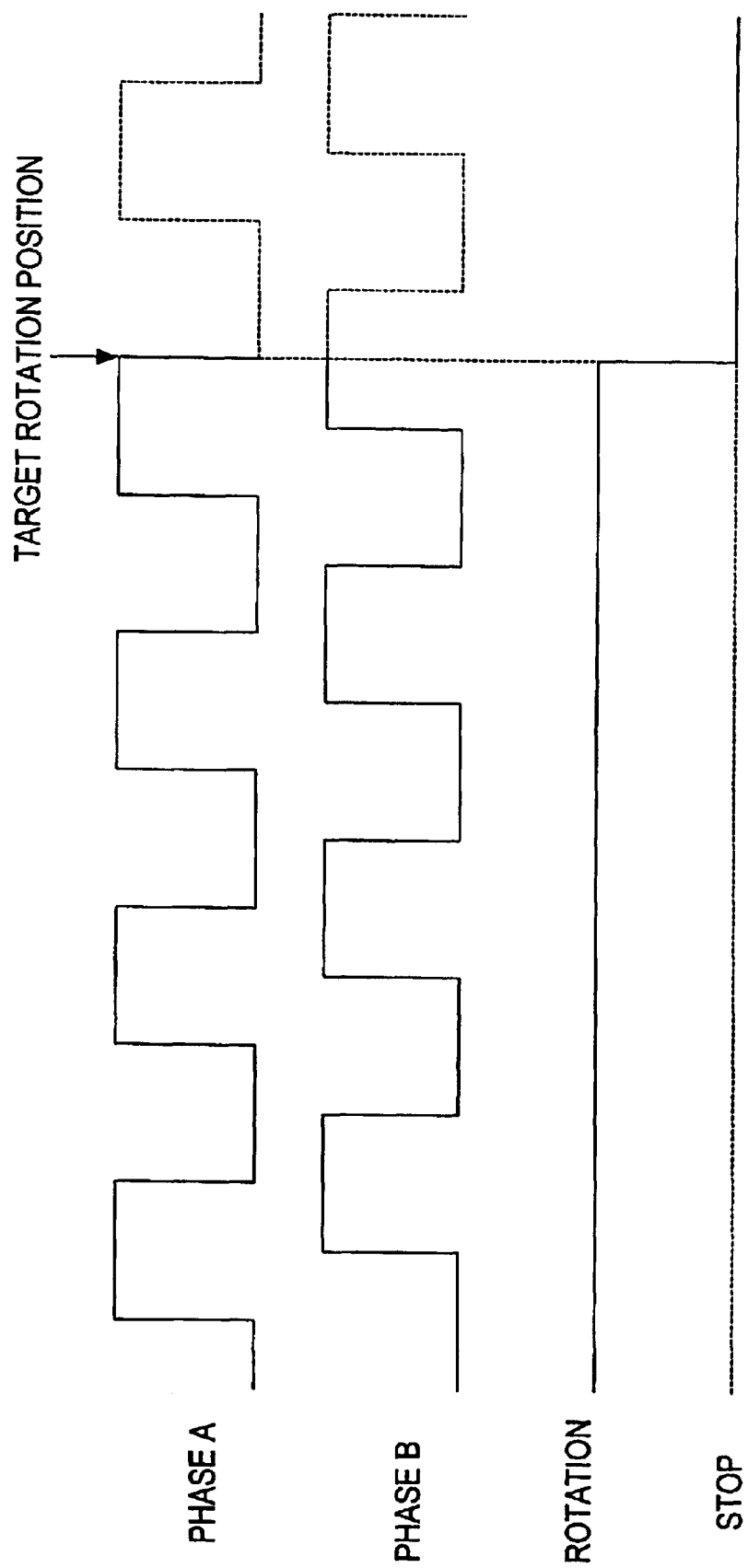
FIG. 11 is a timing chart showing a motor stop timing in a related-art apparatus.

This control is repeatedly performed, and the count comparator 17 detects that the count value of the position counter 16 agrees with the set value of the stop position setting register 12, and outputs the agreement signal to the stop position processor 22. Then, the stop position processor 22 outputs the stop command signal and stop interrupt signal in synchronization with the edge (i.e., the rising edge of the phase-B signal) detected first after the agreement signal is detected (see FIG. 10).

It is to be noted that the driving process of the transfer roller 50 performed by the CPU 2a of the printer of the second embodiment is the same as that of the first embodiment except that it is unnecessary to set the delay time t in S100 performed by the CPU 2.

In the motor control apparatus 20 constituted as described above, the transfer roller 50 is stopped in synchronization with the edge detected after the pass timing signal corresponding to the target stop position is detected until the adjacent signal is detected. Therefore, the effect similar to that of the motor control apparatus 1 of the first embodiment can be obtained.

Here, in the above-described embodiment, the LF motor 51 is stopped in the falling edge of the phase-B signal detected first after the pass timing signal corresponding to the target stop position is detected. However, the motor may also be stopped in the edge of the phase-A signal which is detected next to the above-described falling edge and which is not used in the pass timing signal. This edge is the rising edge in the forward rotation or the falling edge in the backward rotation. Alternatively, the motor may also be stopped in the rising edge of the phase-B signal.

Moreover, in the above-described embodiment, the roller positioning section 6a counts the edge of the phase-A signal at the time at which the phase-B signal is in the high level as the pass timing signal. However, the roller positioning section 6a may also be constituted so as to count the opposite edges of the phase-A signal as the pass timing signals (twice count).

Furthermore, in the motor control apparatus 20 of the present embodiment, the LF motor 51 is stopped in synchronization with the edge detected after the pass timing signal corresponding to the target stop position is detected until the adjacent signal is detected. However, the LF motor 51 may also be constituted to stop after the delay time t further after the edge is detected.

In this case, the time setting register 11 of the first embodiment may be added to the register group 5a of the ASIC 3a. Moreover, the stop position processor 22 may be set so as to count the delay time t in synchronization with the edge detected after the agreement signal is detected until the adjacent signal is detected. Additionally, the delay time t is set to be smaller than the time interval from when the edge for use in the timing to start counting the delay time t is detected until the adjacent signal is detected.

The embodiments of the present invention have been described above, but the present invention is not limited to the above-described embodiments, and can, needless to say, take various modes within the technical scope of the present invention.

For example, the present invention is applied to the sheet feed mechanism of the printer in the above-described embodiments, but can also be applied to any constitution in which the motor and encoder are used such as the driving mechanism of a printer carriage. It is to be noted that in the present invention applied to the carriage driving mechanism, a linear encoder may be used instead of the rotary encoder.

Moreover, the optical encoder is used in the embodiments, but a magnetic encoder may also be used instead.

Furthermore, the rotation position of the transfer roller 50 is detected in the embodiments. However, the motor control apparatus may also be constituted such that the rotary encoder is attached to the rotation shaft of the LF motor 51 and the rotation position (rotation angle) of the rotation shaft of the LF motor 51 is detected.

Additionally, the ASIC is used in generating the PWM signals in the embodiments, but programmable logic devices may also be used such as a complex programmable logic device (CPLD) and field programmable gate array (FPGA).

What is claimed is:

1. A motor control method for controlling a motor based on a pass timing signal indicating a timing in which a movable part of a motor or a member to be driven by the motor passes each of a plurality of preset defined positions, the method comprising the steps of:

detecting the timing corresponding to a target stop position in which said movable part or member to be driven is to be stopped based on said pass timing signal; and stopping said motor in a preset stop timing while said movable part or member to be driven reaches the defined position disposed beyond and adjacent to said target stop position.

2. A motor control apparatus comprising:

a pass timing generator for generating a pass timing signal indicating a timing in which a movable part of a motor or a member to be driven by the motor passes each of a plurality of preset defined positions; and a stop instructing portion for instructing the motor to stop in a preset stop timing while said movable part or member to be driven reaches the defined position disposed beyond and adjacent to a target stop position, when detecting the timing corresponding to the target stop position in which said movable part or member to be driven is to be stopped based on said pass timing signal generated by the pass timing generator.

3. The motor control apparatus according to claim 2, wherein said stop instructing portion comprises a timer for starting measurement of time, on detecting the timing corresponding to said target stop position, and a time at which the timer ends the measurement of a preset delay time is set to said stop timing.

4. The motor control apparatus according to claim 2, wherein said pass timing generator comprises an encoder for generating a pulse string in which at least one of rising and falling edges corresponds to the pass timing of said defined position as said pass timing signal, and said stop instructing portion comprises:

a delay edge detector for detecting the edge of said pulse string generated while said movable part or said member to be driven passes the defined position corresponding to said target stop position and subsequently reaches the defined position disposed beyond and adjacent to the target stop position; and a stop timing generator for generating said stop timing based on the timing of the edge detected by the delay edge detector.

5. The motor control apparatus according to claim 4, wherein said encoder generates said pass timing signal as well as a direction judgment signal having a phase different from that of the pass timing signal, and said delay edge detector detects the edge of said direction judgment signal.

6. The motor control apparatus according to claim 4, wherein said stop timing generator generates the timing of the edge detected by said delay edge detector as said stop timing.

7. The motor control apparatus according to claim 5, wherein said stop timing generator generates the timing of the edge detected by said delay edge detector as said stop timing.

8. The motor control apparatus according to claim 4, wherein said stop timing generator comprises a timer for starting measurement of time by the timing of the edge detected by said delay edge detector, and the stop timing generator generates a time at which the timer ends the measurement of the preset delay time as said stop timing.

9. The motor control apparatus according to claim 5, wherein said stop timing generator comprises a timer for starting measurement of time by the timing of the edge detected by said delay edge detector, and the stop timing generator generates a time at which the timer ends the measurement of the preset delay time as said stop timing.

10. The motor control apparatus according to claim 4, wherein said encoder comprises a rotary or linear encoder.

11. The motor control apparatus according to claim 4, wherein said encoder comprises an optical or magnetic encoder.

12. A motor control apparatus comprising:

pass timing generating means for generating a pass timing signal indicating a timing in which a movable part of a motor or a member to be driven by the motor passes each of a plurality of preset defined positions; and stop instructing means for instructing the motor to stop in a preset stop timing while said movable part or member to be driven reaches the defined position disposed beyond and adjacent to a target stop position, when detecting the timing corresponding to the target stop position in which said movable part or member to be driven is to be stopped based on said pass timing signal generated by the pass timing generating means.

* * * * *